(12) United States Patent
Xia et al.

(10) Patent No.: US 11,630,373 B2
(45) Date of Patent: Apr. 18, 2023

(54) SYSTEM AND METHOD FOR GENERATING HERALDED SINGLE PHOTON

(71) Applicant: NANJING UNIVERSITY, Nanjing (CN)

(72) Inventors: Keyu Xia, Nanjing (CN); Yang Wu, Nanjing (CN); Han Zhang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/260,241

(22) PCT Filed: Aug. 19, 2020

(86) PCT No.: PCT/CN2020/109979
§ 371 (c)(1),
(2) Date: Jul. 13, 2022

(87) PCT Pub. No.: WO2021/042988
PCT Pub. Date: Mar. 11, 2021

(65) Prior Publication Data
US 2022/0357633 A1 Nov. 10, 2022

(30) Foreign Application Priority Data
Sep. 5, 2019 (CN) .......................... 201910836348.7

(51) Int. Cl.
*G02F 1/355* (2006.01)
*G02F 1/35* (2006.01)
(52) U.S. Cl.
CPC .......... *G02F 1/3553* (2013.01); *G02F 1/3503* (2021.01); *G02F 1/3511* (2013.01)
(58) Field of Classification Search
None
See application file for complete search history.

(56) References Cited

U.S. PATENT DOCUMENTS 11,303,361 B2 * 4/2022 Ling ..................... H04B 10/70
11,493,384 B1 * 11/2022 Ihn ............................ G01J 1/44
(Continued)

FOREIGN PATENT DOCUMENTS

EP 3971638 A1 * 3/2022

OTHER PUBLICATIONS

V. S. S. Sundaram, et al., "Integration of a visible-telecom PPKTP photon pair source with Silicon Integrated Photonics," in Conference on Lasers and Electro-Optics, J. Kang et al., eds., OSA Technical Digest (Optica Publishing Group, 2021), paper FTu2N.3. (Year: 2021).*

(Continued)

*Primary Examiner* — Rhonda S Peace
(74) *Attorney, Agent, or Firm* — CBM Patent Consulting, LLC

(57) ABSTRACT

It discloses a system and a method for generating heralded single photons, wherein the system comprises a high-quality optical ring cavity, a PPKTP nonlinear crystal, a polarization beam splitter, a dichroic mirror, a light filtering device, a reflector module, an atomic vapor cell and a single photon detector, wherein: the high-quality optical ring cavity is formed by a first plano-concave reflector, a second plano-concave reflector, a third plano-concave reflector and a fourth plano-concave reflector; the PPKTP nonlinear crystal and the polarization beam splitter are positioned in an optical path between the first plano-concave reflector and the second plano-concave reflector; the dichroic mirror is positioned in an optical path behind a reflecting end of the polarization beam splitter.

9 Claims, 4 Drawing Sheets

(56) References Cited

U.S. PATENT DOCUMENTS 11,569,816 B1\* 1/2023 Najafi .................... H01H 3/005
2022/0357633 A1\* 11/2022 Xia ....................... G02F 1/3503

OTHER PUBLICATIONS

R. Nehra, A. Win, M. Eaton, N. Sridhar, R. Shahrokhshahi, T. Gerrits, A. Lita, S. W. Nam, and O. Pfister, "Quantum tomography of a single-photon state by photon-number parity measurements," in Conference on Lasers and Electro-Optics, OSA Technical Digest (Optica Publishing Group, 2019), paper FF1A.6. (Year: 2019).\*
Wolfgramm, F., de Icaza Astiz, Y. A., Beduini, F. A., Cerè, A., and Mitchell, M. W., "Atom-Resonant Heralded Single Photons by Interaction-Free Measurement", Physical Review Letters, vol. 106, No. 5, 2011. doi:10.1103/PhysRevLett.106.053602. (Year: 2011).\*

\* cited by examiner

SYSTEM AND METHOD FOR GENERATING HERALDED SINGLE PHOTON

TECHNICAL FIELD

The present invention relates to the field of photonic quantum information technology, and in particular to a system and a method for generating heralded single photons.

BACKGROUND

The single photon source is one of the cores of photonic quantum information processing, and can directly affect the capacity of photon-based quantum communication and quantum computing. There are various methods for generating single-photons, including a photon blocking method, a nonlinear mixing method, a cavity quantum electrodynamics method, a spontaneous parametric down-conversion method (see *Nature Photonics* 5, 628 (2011)), and the like. The heralded single photon source based on spontaneous parametric down-conversion has always been one of the mainstream methods for generating single photons in the field of photonic quantum information technology due to its good photon homogeneity, high single-photon purity, and simple preparation method. The single photon sources prepared using this method are nearly perfect except for a small probability of single-photon generation (see *Nature Nanotechnology* 12, 1026 (2017)). The established spontaneous parametric down-conversion methods for generating heralded single photons all exhibit an inherent contradiction between yield improvement and purity of single photons. In the spontaneous parametric down-conversion process, the pump laser is required to be weak enough so as to produce only one pair of parametric photons as possible. Thus, the generation rate of multiple pairs of photons is extremely low, resulting in a low generation rate of heralded single photons, which greatly limits its application in photonic quantum information technology. How to solve in principle the inherent contradiction between the high purity and high yield of single photons in this method is the key to extend its application and even can lead us into many unprecedented fields.

SUMMARY

Purpose: for the problems in the prior art, the present invention provides a system and a method for generating heralded single photons. By utilizing a photon blockade effect, the present invention solves the contradiction between high purity and high yield of heralded single photons in the spontaneous parametric down-conversion method, and improves the yield of heralded single photons at room temperature and on the premise of guaranteeing the purity.

Technical solution: the system for generating heralded single photons described herein comprises a high-quality optical ring cavity, a PPKTP nonlinear crystal, a polarization beam splitter, a dichroic mirror, a light filtering device, a reflector module, an atomic vapor cell and a single photon detector, wherein: the high-quality optical ring cavity is formed by a first plano-concave reflector, a second plano-concave reflector, a third plano-concave reflector and a fourth plano-concave reflector; the PPKTP nonlinear crystal and the polarization beam splitter are positioned in an optical path between the first plano-concave reflector and the second plano-concave reflector; the dichroic mirror is positioned in an optical path behind a reflecting end of the polarization beam splitter; the light filtering device and the single photon detector are sequentially positioned in an optical path behind the second plano-concave reflector; the atomic vapor cell is positioned in an optical path between the third plano-concave reflector and the fourth plano-concave reflector; the reflector module is used to reflect a control light, and the reflected control light passes through the atomic vapor cell.

Further, a pump light is incident into a plane of the first plano-concave reflector; concave surfaces and planes of the first plano-concave reflector and the second plano-concave reflector are each coated with a pump light anti-reflection film; concave surfaces of the first plano-concave reflector, the second plano-concave reflector, the third plano-concave reflector and the fourth plano-concave reflector are each coated with an idle light reflective film, and planes thereof are each coated with an idle light anti-reflection film; reflectivity values of the idle light reflective films coated on the concave surfaces of the first plano-concave reflector, the third plano-concave reflector and the fourth plano-concave reflector are the same and greater than that of the idle light reflective film coated on the concave surface of the second plano-concave reflector. Further, the PPKTP nonlinear crystal is used to generate a pair of polarization orthogonal parametric lights, i.e., an idle light and a signal light, and both front and rear end faces of the PPKTP nonlinear crystal are coated with pump light and parametric light anti-reflection films. The PPKTP nonlinear crystal is specifically a type II quasi-phase-matched PPKTP nonlinear crystal with a domain-periodic inversion structure.

Further, the polarization beam splitter reflects a signal light and transmits an idle light, and both front and rear end faces of the polarization beam splitter are coated with pump light and parametric light anti-reflection films. The dichroic mirror reflects the pump light and transmits the signal light. The light filtering device is used to filter out the control light scattered into an idle light. The atomic vapor cell is specifically N energy level atomic vapor cell.

Further, the reflector module comprises a first reflector and a second reflector, an axis formed by the first reflector and the second reflector is kept at an angle of 3-5 degrees to an axis formed by the atomic vapor cell and the high-quality optical ring cavity, and the reflected control light is thus allowed to pass through the atomic vapor cell.

The method for generating heralded single photons described herein comprises:

step 1: forming an optical ring cavity by a first plano-concave reflector, a second plano-concave reflector, a third plano-concave reflector and a fourth plano-concave reflector;

step 2: enabling normal incidence of a pump light through a plane of the first plano-concave reflector;

step 3: providing a PPKTP nonlinear crystal behind the first plano-concave reflector, such that the incident pump light, when passing through the PPKTP nonlinear crystal, generates a spontaneous parametric down-conversion process to control pump light intensity and pulse length, and a pair of polarization orthogonal parametric photons, i.e., an idle photon and a signal photon, are generated with a probability close to 1;

step 4: providing a polarization beam splitter behind the PPKTP nonlinear crystal, wherein the polarization beam splitter reflects a vertically polarized pump light and a vertically polarized signal light in the parametric light emitted by the PPKTP nonlinear crystal, and transmits a horizontally polarized idle light;

step 5: allowing the second plano-concave reflector to reflect the idle light having passed through the PPKTP nonlinear crystal and the polarization beam splitter successively back to the first plano-concave reflector via the third plano-concave reflector and the fourth plano-concave reflector, so as to form a stable cavity mode, wherein the idle light cavity mode is transmitted through the second plano-concave reflector;

step 6: providing an atomic vapor cell in an optical path of the idle light between the third plano-concave reflector and the fourth plano-concave reflector, and allowing the control light to pass through the atomic vapor cell by reflecting with a reflector to induce a strong self-Kerr nonlinear optical effect of the idle light;

step 7: providing a dichroic mirror behind a reflecting end of the polarization beam splitter, wherein the dichroic mirror reflects the pump light and transmits the signal light;

step 8: providing a light filtering device behind the dichroic mirror, wherein the light filtering device is used to filter out the control light scattered into the idle light; and step 9: providing a single photon detector behind the light filtering device, wherein the single photon detector, on the premise of triggering a signal light, is used to measure idle light photons, and obtain heralded single photons if the measurement succeeds.

Advantageous effect: the present invention has the following significant advantages over the prior art: instances of generating multiple pairs of photons are suppressed by adding an atomic vapor cell to the ring optical cavity at room temperature and thus inducing a quantum blockade effect of idle light (see FIGS. 3 and 4). This ensures the purity of single photons (see FIG. 5) while improving the yield of heralded single photons by increasing the pump light power (see FIGS. 3 and 4), and thus solves the contradiction between yield improvement and high purity in the preparation of heralded single photons in the spontaneous parametric down-conversion process. In case of a strong pump light, nonlinear photon blockade (see FIG. 4) leads to far fewer instances of multiple pairs of photons than in the absence of photon blockade (see FIG. 3), with much higher yield of parametric single photon pair and better purity of the resulting heralded single photons than in the absence of nonlinear blockade (see FIG. 5).

DETAILED DESCRIPTION

EXAMPLE 1

Figure 1:
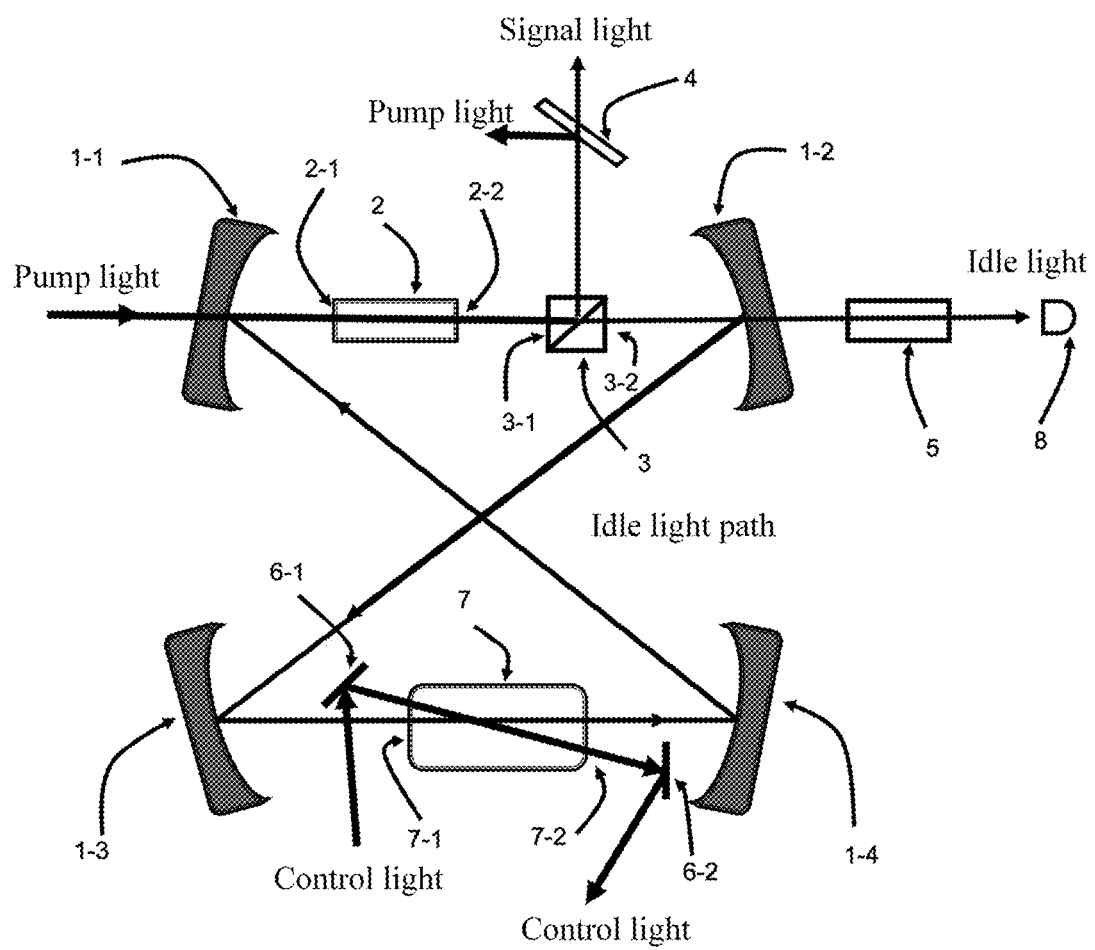
FIG. 1 is a structure diagram of an embodiment of a system for generating heralded single photons provided by the present invention.

This example provides a system for generating heralded single photons, comprising a high-quality optical ring cavity, a PPKTP nonlinear crystal 2, a polarization beam splitter 3, a dichroic mirror 4, a light filtering device 5, a reflector module, an atomic vapor cell 7 and a single photon detector 8, as shown in FIG. 1. The following is a detailed description of each component.

The high-quality optical ring cavity is formed by a first plano-concave reflector 1-1, a second plano-concave reflector 1-2, a third plano-concave reflector 1-3 and a fourth plano-concave reflector 1-4, and it has two beam waists. Concave surfaces and planes of the first plano-concave reflector 1-1 and the second plano-concave reflector 1-2 are each coated with a pump light anti-reflection film, with a transmittance greater than 99.5%, thus allowing a pump light to be transmitted almost untouched. Concave surfaces of the four plano-concave reflectors are each coated with an idle light reflective film. The reflectivity values of idle light reflective films coated on the concave surfaces of the first plano-concave reflector 1-1, the third plano-concave reflector 1-3 and the fourth plano-concave reflector 1-4 are the same and greater than 99.9%; the reflectivity value of the idle light reflective film coated on the concave surface of the second plano-concave reflector 1-2 is 96%-98%, which is slightly less than that of the other plano-concave reflectors. The planes of the four plano-concave reflectors are each coated with an idle light anti-reflection film, with a transmittance greater than 99.8%.

The PPKTP nonlinear crystal 2 is a type II quasi-phase-matched PPKTP nonlinear crystal with a domain-periodic inversion structure, and is positioned in an optical path between the first plano-concave reflector 1-1 and the second plano-concave reflector 1-2. When a pump light is normally incident into a plane of the first plano-concave reflector 1-1, the PPKTP nonlinear crystal 2 generates polarization orthogonal parametric light with the same frequency in the spontaneous parametric down-conversion process, i.e., an idle light and a signal light. A front end face 2-1 and a rear end face 2-2 of the PPKTP nonlinear crystals 2 are each coated with pump light and parametric light anti-reflection films, wherein the transmittance of the pump light anti-reflection film is greater than 99.5%, and that of the parametric light anti-reflection film is greater than 99.8%. The idle light generated by the PPKTP nonlinear crystal 2 can be reflected by the four plano-concave reflectors of the high-quality optical ring cavity to form a stable optical cavity mode. After the mode is formed, the idle light mode inside the cavity is transmitted through the second plano-concave reflector 1-2.

The polarization beam splitter 3 is provided behind the PPKTP nonlinear crystal 2 to reflect the pump light and the signal light, and transmit the idle light. A front end face 3-1 and a rear end face 3-2 of the polarization beam splitter 3 are each coated with pump light and parametric light anti-reflection films, wherein the transmittance of the pump light anti-reflection film is greater than 99.5%, and that of the parametric light anti-reflection film is greater than 99.8%.

The atomic vapor cell 7 is positioned in an optical path between the third plano-concave reflector 1-3 and the fourth plano-concave reflector 1-4, and is specifically a rubidium atomic glass vapor cell surrounded by magnetic shielding materials with high magnetic permeability, such as mu metal. A front end face 7-1 and a rear end face 7-2 of the atomic vapor cell 7 are each coated with the idle light anti-reflection film, of which the transmittance is greater than 99.8%, allowing the idle light to pass through the atomic vapor cell 7 via the end faces almost untouched. The reflector module comprises a first reflector 6-1 and a second reflector 6-2 with a reflectivity greater than 99.8%. An axis formed by the first reflector 6-1 and the second reflector 6-2 is kept at a small angle (3-5 degrees) to an axis formed by the atomic vapor cell 7 and the high-quality optical ring cavity, i.e., the control light is allowed to pass through the atomic vapor cell 7 at a small angle of 3-5 degrees to a beam waist of the atomic vapor cell 7 and the high-quality optical ring cavity, wherein a beam waist of the control light is larger than that of the high-quality optical ring cavity in the atomic vapor cell 7. The parameters such as atomic gas density, control light and atomic detuning are controlled through temperature regulation of the atomic vapor cell 7, so that the optical Kerr nonlinearity is much larger than the optical cavity decay rate, i.e., line width, to achieve quantum photon blockade, i.e., the strong self-Kerr nonlinearity of the idle light, thereby suppressing the generation of multiple pairs of photons in the spontaneous parametric down-conversion process of the PPKTP nonlinear crystal 2. The time duration and power of pump light are controlled to achieve a high probability of generating parametric photon pairs. The control light and the idle light passing through the atomic vapor cell 7 in the same direction can eliminate the microscopic Doppler effect caused by random thermal motion of atoms.

The dichroic mirror 4 is positioned in an optical path behind a reflecting end of the polarization beam splitter, whereas the light filtering device 5 and the single photon detector 8 are sequentially positioned in an optical path behind the second plano-concave reflector 1-2. The dichroic mirror 4 reflects the pump light from the reflecting end of the polarization beam splitter, transmits the signal light from the reflecting end of the polarization beam splitter, and separates the pump light from the emitted signal light. The light filtering device 5 is used to filter out the control light scattered into the idle light. The single photon detector 8, on the premise of triggering a signal light, is used to measure idle light photons from the light filtering device 5, and obtain heralded single photons if the measurement succeeds.

This example also discloses a method for generating heralded single photons, which is based on the system described above and specifically comprises:

step 1: forming an optical ring cavity by a first plano-concave reflector 1-1, a second plano-concave reflector 1-2, a third plano-concave reflector 1-3 and a fourth plano-concave reflector 1-4;

step 2: enabling normal incidence of a pump light through a plane of the first plano-concave reflector 1-1, wherein the pump light is 397.5 nm pulsed pump light;

step 3: providing a PPKTP nonlinear crystal 2 behind the first plano-concave reflector 1-1, such that the incident pump light, when passing through the PPKTP nonlinear crystal, generates a spontaneous parametric down-conversion process which, with a high probability, generates a pair of polarization orthogonal parametric photons, i.e., an idle photon and a signal photon with a wavelength of 795 nm; therefore, the pump light anti-reflection film coated on the device transmits at 397.5 nm, while a parametric light reflective film and a parametric light anti-reflection film reflect and transmit respectively at 795 nm;

step 4: providing a polarization beam splitter 3 behind the PPKTP nonlinear crystal 2, wherein the polarization beam splitter 3 reflects a vertically polarized pump light and a vertically polarized signal light in the parametric light emitted by the PPKTP nonlinear crystal 1, and transmits a horizontally polarized idle light;

step 5: allowing the second plano-concave reflector 1-2 to reflect the idle light having passed through the PPKTP nonlinear crystal 2 and the polarization beam splitter 3 successively back to the first plano-concave reflector 1-1 via the third plano-concave reflector 1-3 and the fourth plano-concave reflector 1-4, so as to form a stable cavity mode, wherein a small amount of idle light is transmitted in each subsequent cycle;

step 6: providing an atomic vapor cell 7 in an optical path of the idle light between the third plano-concave reflector 1-3 and the fourth plano-concave reflector 1-4, and allowing the control light to pass through the atomic vapor cell 7 by reflecting with a reflector module 6 to induce a strong self-Kerr nonlinear optical effect of the idle light, wherein the atomic vapor cell 7 is specifically a rubidium atomic glass vapor cell;

step 7: providing a dichroic mirror 4 behind a reflecting end of the polarization beam splitter, wherein the dichroic mirror 4 reflects the pump light and transmits the signal light;

step 8: providing a light filtering device 5 behind the second plano-concave reflector, wherein the light filtering device 5 is used to filter out the control light scattered into the idle light; and step 9: providing a single photon detector 8 behind the light filtering device 5, wherein the single photon detector 8, on the premise of triggering a signal light, is used to measure idle light photons and obtain heralded single photons if the idle photons are detected.

The D1 line energy arrangement of rubidium atoms involved in the N-type energy level system is $|1\rangle = |5^2S_{1/2}, F=3, m_F=-3\rangle$ $|2\rangle = |5^2S_{1/2}, F=3, m_F=-2\rangle$, $|3\rangle = |5^2P_{1/2}, F'=3, m'_F=-3\rangle$, $|4\rangle = |5^2P_{1/2}, F'=3, m'_F=-2\rangle$.

Figure 2:
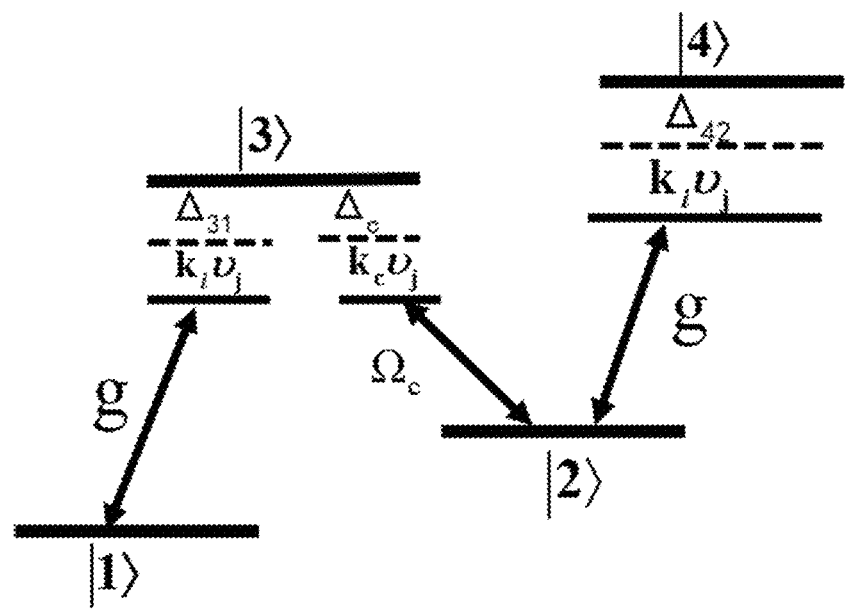
FIG. 2 is a coupling energy level diagram of cavity mode, control light and N-type atom.
Figure 3:
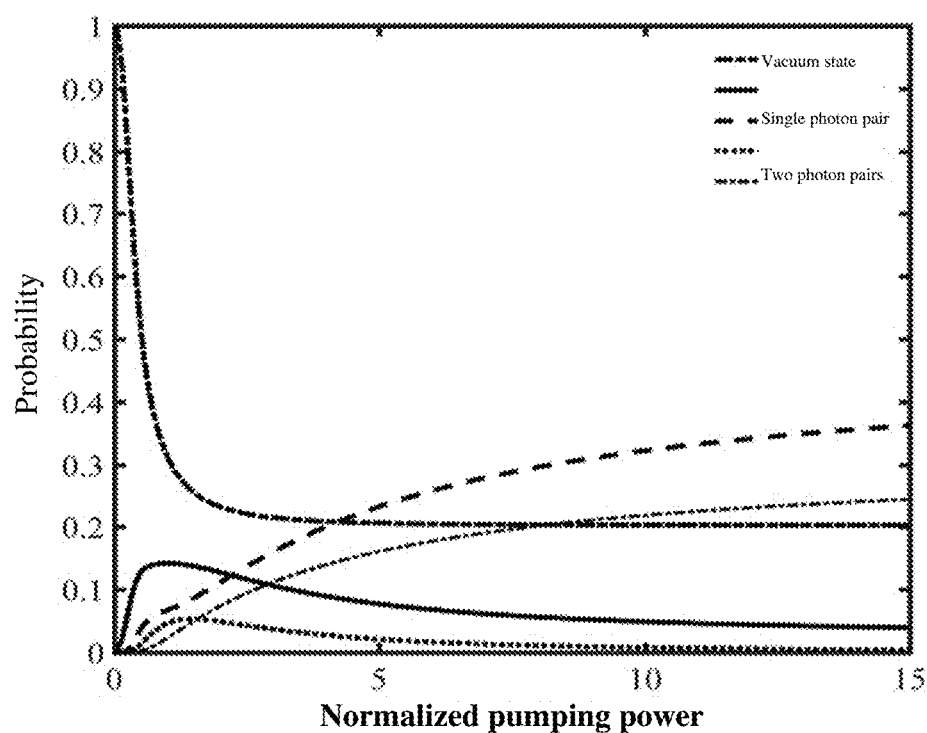
FIG. 3 shows the evolution of Fock state$|n_i, n_s\rangle$ population with pumping efficiency in the absence of quantum blockade effect.
Figure 4:
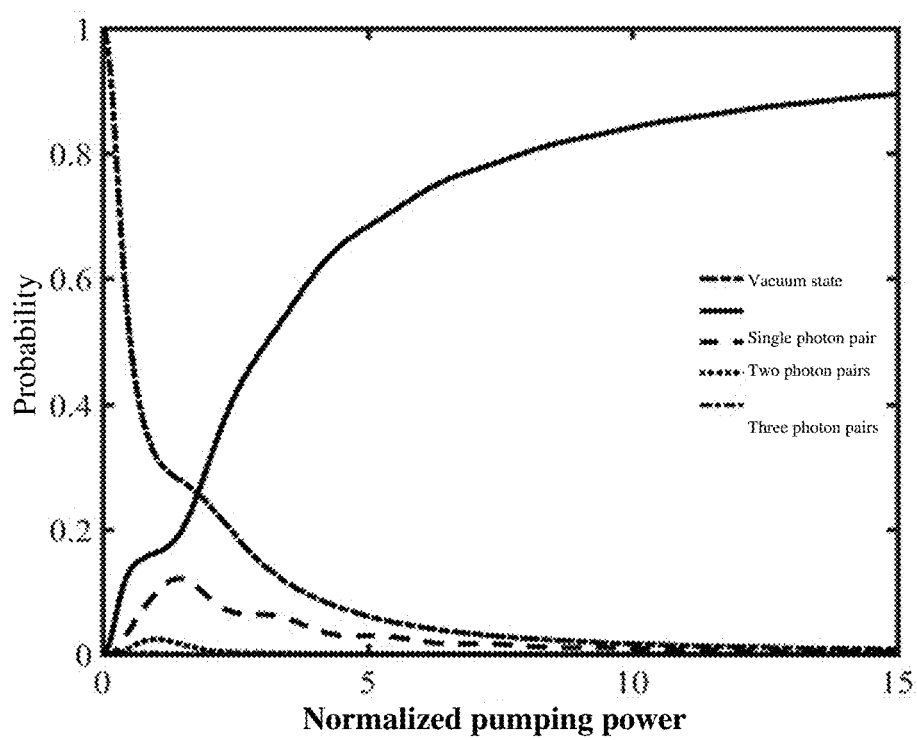
FIG. 4 shows the evolution of Fock state$|n_i, n_s\rangle$ population with pumping efficiency in the presence of quantum blockade effect.
Figure 5:
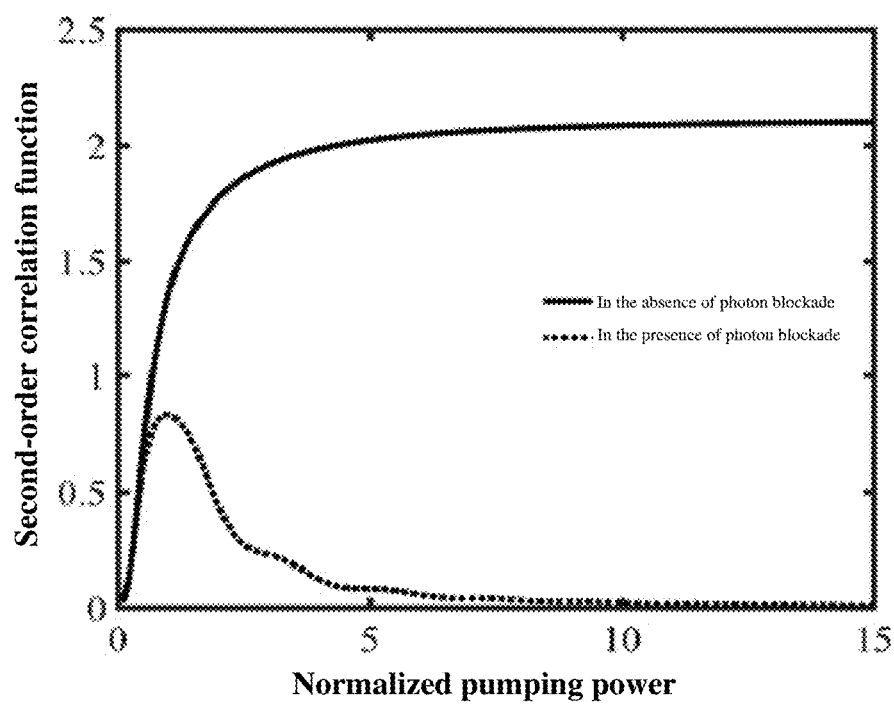
FIG. 5 shows the change of the second-order correlation function g2(0) with pumping power.

The idle light is horizontally polarized and couples transitions 1 to 3 and 2 to 4, and the left-hand circularly polarized control light couples transition 2 to 3, as shown in FIG. 2. As such, the single photon generation rate will be improved significantly over the existing spontaneous parametric down-conversion methods, e.g., 80%, provided that the single photon purity of the signal light is greater than 95%, as shown in FIG. 3 and FIG. 4. FIG. 3 shows the evolution of the Fock state $|n_i, n_s\rangle$ population with pumping efficiency in the absence of quantum blockade effect, wherein the number of photon pairs increases rapidly when the normalized pumping power increases, and the single photon pair component is below 0.05 when the normalized pumping power is higher than 5. FIG. 4 shows the evolution of Fock state $|n_i, n_s\rangle$ population with pumping efficiency in the presence of quantum blockade effect, wherein the optimal relationship between the Kerr nonlinearity coefficient and the effective pumping power P is: $\eta = P$. The instance of multiple pairs of photons is greatly suppressed and almost impossible, while the probability of parametric photon pairs is very high, which can be higher than 0.8. FIG. 5 shows the change of the second-order correlation function g2(0) with pumping power. When the pumping power is relatively high, the system without quantum blockade generates single photons with low purity, with g2(0) close to 2, and the system with quantum blockade has high single photon purity, with g2(0) less than 1.

EXAMPLE 2

The difference between this example and Example 1 lies in that the atomic vapor cell 7 used herein is cesium atomic vapor cell. If the idle light is blocked with the cesium atom D1 line, the corresponding wavelength of pump laser should be 447.3 nm, and the anti-reflection film for pump light should also be at 447.3 nm. The signal light and idle light generated is 894.6 nm, and the anti-reflection films for the signal light and idle light should also be at 894.6 nm. The transition energy levels of cesium atoms involved are $|1\rangle=|6^2S_{1/2}, F=4, m_F=-4\rangle$, $|2\rangle=|6^2S_{1/2}, F=4, m_F=-3\rangle$, $|3\rangle=|6^2P_{1/2}, F'=4, m'_F=-4\rangle$ and $|4\rangle=|6^2P_{1/2}, F'=4, m'_F=-3\rangle$. Two transitions 1 to 3 and 2 to 4 are coupled by the idle light at 894.6 nm, and transition 2 to 3 is coupled by left-hand circularly polarized control light at 894.6 nm.

EXAMPLE 3

The difference between this example and Example 1 lies in that the atomic vapor cell 7 used herein is a silicon color center defect in diamond. In this example, the solid diamond film should be cooled to a low temperature of 4K, with a negatively charged silicon color center defect acting as an N-type energy system. Similar to Example 2, the wavelength of pump light should be adjusted to 369 nm, that of signal light and idle light generated by the PPKTP crystal be adjusted to 738 nm, and the working wavelength of corresponding anti-reflection film and reflective film be adjusted to 369 nm and 738 nm respectively. The corresponding transition energy levels of the silicon color center defect involved are $|1\rangle=|e_{g-}, \downarrow\rangle$, $|2\rangle=|e_{g+}, \uparrow\rangle$, $|3\rangle=|e_{u-}, \downarrow\rangle$ and $|4\rangle=|e_{u+}, \uparrow\rangle$. Two transitions 1 to 3 and 2 to 4 are coupled by the horizontally polarized idle light at 738 nm, and transition 2 to 3 is coupled by right-hand circularly polarized control light at 738 nm.

The foregoing descriptions are only preferred examples of the present invention, and should not be construed as limiting the scope of claims set forth herein. Therefore, the equivalent changes made according to the claims of the present invention should fall within the scope of the present invention.

What is claimed is:

1. A system for generating heralded single photons, comprising: a high-quality optical ring cavity, a PPKTP nonlinear crystal, a polarization beam splitter, a dichroic mirror, a light filtering device, a reflector module, an atomic vapor cell and a single photon detector, wherein: the high-quality optical ring cavity is formed by a first plano-concave reflector, a second plano-concave reflector, a third plano-concave reflector and a fourth plano-concave reflector; the PPKTP nonlinear crystal and the polarization beam splitter are positioned in an optical path between the first plano-concave reflector and the second plano-concave reflector; the dichroic mirror, the light filtering device and the single photon detector are sequentially positioned in an optical path behind the second plano-concave reflector; the atomic vapor cell is positioned in an optical path between the third plano-concave reflector and the fourth plano-concave reflector; the reflector module is used to reflect a control light and comprises a first reflector and a second reflector; an axis formed by the first reflector and the second reflector is kept at an angle of 3-5 degrees to an axis formed by the atomic vapor cell and the high-quality optical ring cavity, and the reflected control light is allowed to pass through the atomic vapor cell.

2. The system for generating heralded single photons according to claim 1, wherein: a pump light is incident into a plane of the first plano-concave reflector; concave surfaces and planes of the first plano-concave reflector and the second plano-concave reflector are each coated with a pump light anti-reflection film; concave surfaces of the first plano-concave reflector, the second plano-concave reflector, the third plano-concave reflector and the fourth plano-concave reflector are each coated with a parametric light reflective film, and planes thereof are each coated with a parametric light anti-reflection film; reflectivity values of the parametric light reflective films coated on the concave surfaces of the first plano-concave reflector, the third plano-concave reflector and the fourth plano-concave reflector are the same and greater than that of the parametric light reflective film coated on the concave surface of the second plano-concave reflector.

3. The system for generating heralded single photons according to claim 1, wherein: the PPKTP nonlinear crystal is used to generate a pair of polarization orthogonal parametric lights, i.e., an idle light and a signal light, and both front and rear end faces of the PPKTP nonlinear crystal are coated with pump light and parametric light anti-reflection films.

4. The system for generating heralded single photons according to claim 1, wherein the PPKTP nonlinear crystal is specifically a type II quasi-phase-matched PPKTP nonlinear crystal with a domain-periodic inversion structure.

5. The system for generating heralded single photons according to claim 1, wherein the polarization beam splitter reflects a signal light and transmits an idle light and a pump light, and both front and rear end faces of the polarization beam splitter are coated with pump light and parametric light anti-reflection films.

6. The system for generating heralded single photons according to claim 1, wherein the dichroic mirror reflects a pump light and transmits an idle light, and front and rear end faces of the dichroic mirror are each coated with an idle light anti-reflection film.

7. The system for generating heralded single photons according to claim 1, wherein the light filtering device is used to filter out the control light scattered into an idle light.

8. The system for generating heralded single photons according to claim 1, wherein the atomic vapor cell is specifically N energy level atomic vapor cell.

9. A method for generating heralded single photons, comprising:
   step 1: forming an optical ring cavity by a first plano-concave reflector, a second plano-concave reflector, a third plano-concave reflector and a fourth plano-concave reflector;
   step 2: enabling normal incidence of a pump pulsed light through a plane of the first plano-concave reflector;
   step 3: providing a PPKTP nonlinear crystal behind the first plano-concave reflector, such that the incident pump light, when passing through the PPKTP nonlinear crystal, generates a spontaneous parametric down-conversion process to control pump light intensity and pulse length, and a pair of polarization orthogonal parametric photons, i.e., an idle photon and a signal photon, are generated with a probability close to 1;
   step 4: providing a polarization beam splitter behind the PPKTP nonlinear crystal, wherein the polarization beam splitter reflects a vertically polarized signal light in the parametric light emitted by the PPKTP nonlinear crystal and transmits a horizontally polarized idle light therein;
   step 5: allowing the second plano-concave reflector to transmit the pump light having passed through the PPKTP nonlinear crystal and the polarization beam splitter successively, and reflect the idle light transmitted by the polarization beam splitter back to the first plano-concave reflector via the third plano-concave reflector and the fourth plano-concave reflector, so as to form a stable cavity mode, wherein the idle light cavity mode is transmitted through the second plano-concave reflector and detected by a single photon detector after passing through a dichroic mirror and a light filtering device;

step 6: providing an atomic vapor cell in an optical path of the idle light between the third plano-concave reflector and the fourth plano-concave reflector, and allowing the control light to pass through the atomic vapor cell by reflecting with a reflector module to induce a strong self-Kerr nonlinear optical effect of the idle light, wherein the reflector module comprises a first reflector and a second reflector, and an axis formed by the first reflector and the second reflector is kept at an angle of 3-5 degrees to an axis formed by the atomic vapor cell and the high-quality optical ring cavity;

step 7: providing the dichroic mirror behind the second plano-concave reflector, wherein the dichroic mirror reflects the pump light and transmits the idle light;

step 8: providing the light filtering device behind the dichroic mirror, wherein the light filtering device filters out the control light scattered into the idle light; and step 9: providing a single photon detector behind the light filtering device, wherein the single photon detector, on the premise of triggering a signal light, is used to measure idle light photons, and obtain heralded signal single photons if the measurement succeeds.

* * * * *